United States Patent

McAlpin

[15] 3,696,326
[45] Oct. 3, 1972

[54] DEPTH SOUNDER DIGITIZER
[72] Inventor: Silvan E. McAlpin, Dallas, Tex.
[73] Assignee: Mobil Oil Corporation
[22] Filed: May 21, 1970
[21] Appl. No.: 39,494

[52] U.S. Cl. .............................................. 340/3 R
[51] Int. Cl. .............................................. G01s 9/68
[58] Field of Search ..... 340/1 R, 3 R; 343/50 P, 13 R

[56] References Cited

UNITED STATES PATENTS 3,195,103  7/1965  Drenkelfort ................. 340/3
3,307,143  2/1967  Wyse et al. ................. 340/3

Primary Examiner—Richard A. Farley
Attorney—William J. Scherback, Frederick E. Dumoulin, Arthur F. Zobal, Andrew L. Gaboriault and Sidney A. Johnson

[57] ABSTRACT

A water depth digitizer produces a digital readout from a depth sounder of the type which produces an acoustic ranging pulse and which includes a transducer producing a receive signal representing the return of a reflected acoustic ranging pulse. A digital counter is started in response to an acoustic ranging pulse and is stopped in response to the receive signal occurring after the selected ranging pulse. In order to prevent erroneous readings which occur because the reflected acoustic ranging pulse is not of sufficient amplitude to be detected, a circuit is provided to detect valid information. The digital counter is reset when a receive signal is not received before the next occurring acoustic ranging pulse.

5 Claims, 1 Drawing Figure

PATENTED OCT 3 1972  3,696,326
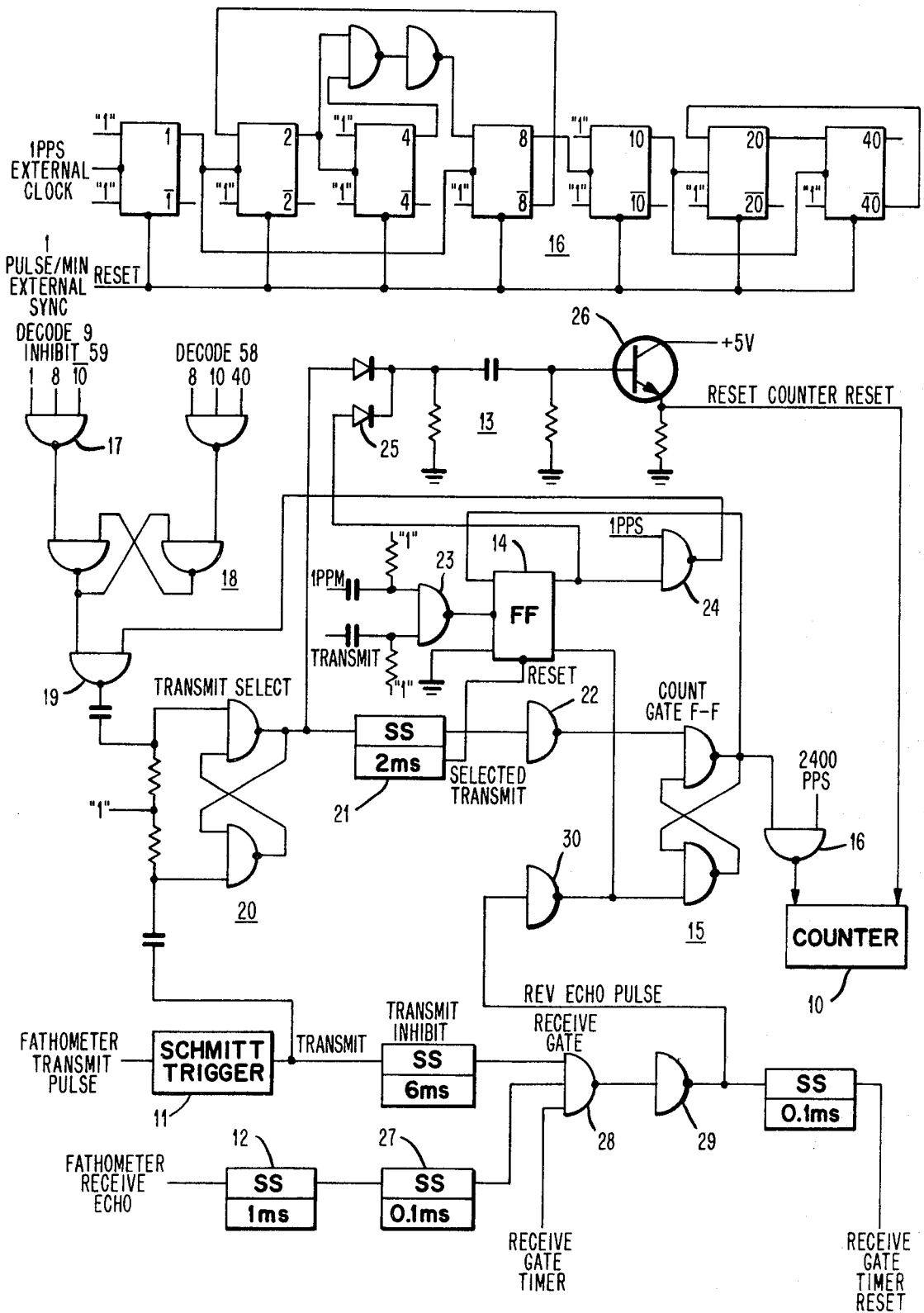

DEPTH SOUNDER DIGITIZER

BACKGROUND OF THE INVENTION

This invention relates to a digitizer for a water sounder and more particularly to a digitizer which discriminates between accurate and inaccurate water depth measurements.

Depth sounders which measure the time of return of acoustic ranging pulses have been successfully used to accurately measure water depth. Recently, there has been a trend toward automation in hydrographic survey and oceanography which requires the automatic readout of depth from the depth sounder. "Digital Readout Echo Sounder", by C. H. Cook, Proceedings of the IERE Conference on Electronic Engineering and Oceanography, 1966, describes a system for automatic readout of depth from an echo sounder. U.S. Pats. Nos. 3,307,143 - Wyse et al and 3,344,421 - Dildy, Jr., describes digital readout systems for echo ranging devices.

In some circumstances, a digitizer which produces a readout averaged over a plurality of depth soundings is required. Such a digitizer is described in my copending application Ser. No. 862,204, field Sept. 30, 1969, entitled Depth Sounder DIGITIZER. The operation of that depth sounder is quite satisfactory. However, in certain areas the reflected acoustic ranging pulse is often quite weak and below the level of detection. When the reflected pulse is not received, the digitizer produces an erroneous output. That digitizer includes a counter which is started by the acoustic ranging pulse and stopped by a receive signal. If the reflected pulse is not detected to produce this receive signal, the digital counter continues counting until the occurrence of the next acoustic ranging pulse. This produces erroneous readings. The present invention is an improvement on the depth sounder digitizer of my pending application.

SUMMARY OF THE INVENTION

The water depth digitizer of the present invention discriminates between accurate and inaccurate water depth measurements. An accurate measurement of water depth is produced, or a reading of zero is produced by the digitizer to indicate no measurement was made.

The counter which accumulates counts representing water depth has a reset circuit for returning the counter to zero when an inaccurate sequence of acoustic ranging and receive pulses occurs. The reset circuit is enabled when a receive signal is not received before the next occuring acoustic ranging pulse. In one particular embodiment of the invention a logic circuit is provided which accepts only a specified sequence of acoustic ranging and receive pulses within a given time window and rejects all other sequences. If an acoustic ranging pulse is followed by a receive signal within the given time period, an accurate water depth readout is produced. If that sequence does not occur because of no reception of the reflected acoustic ranging pulse from the sea bottom, or if the receive signal is not strong enough to trigger the gating circuitry in the depth sounder digitizer, water depth readout of zero is produced.

In one particular embodiment of the invention the logic circuit includes a toggle flip-flop of the type having two steering inputs an a toggle input. The accoustic ranging pulses applied to the toggle input. A count gate flip-flop is set by an acoustic ranging pulse and reset by the receive signal. The output of the count gate flip-flop is connected to a steering input of the toggle flip-flop so that the next occurring acoustic ranging pulse will switch the state of the toggle flip-flop only if the count flip-flop is in the set position. The output of the toggle flip-flop is connected to the reset circuit so that the counter is reset when the toggle flip-flop is switched.

The foregoing and other objects, features, and advantages of this invention will be better understood from the following more detailed description and appended claims in conjunction with the drawings.

DESCRIPTION OF THE DRAWINGS

FIG. 1 shows a logic diagram of the invention.

DESCRIPTION OF A PARTICULAR EMBODIMENT

Referring to FIG. 1, the digital counter 10 produces a digitized readout representing water depth. The counter 10 is started in response to an acoustic ranging pulse applied to the Schmidt trigger 11 and is stopped by the receive signal applied to the single shot multivibrator 12. A reset circuit 13 resets the counter 10 when an invalid combination of acoustic ranging and receive pulses occurs. The logic circuit for enabling this reset circuit includes a toggle flip-flop 14 of the type having two steering inputs and a toggle input. As is standard in these type of flip-flops, the middle input is a toggle input which can change the state of the flip-flop depending upon the condition of the other two inputs. For example, only when a "1" appears at the top input to the flip-flop will the flip-flop be switched from the zero to the 1 state by the toggle input.

A count gate flip-flop 15 is set by an acoustic ranging pulse and reset by the receive signal. The output of the count gate flip-flop 15 is connected to the top steering input of toggle flip-flop 14. The acoustic ranging pulses are applied to the toggle input of flip-flop 14 so that an acoustic ranging pulse will switch the state of the toggle flip-flop 14 only if the count flip-flop 15 is in the set position. The output of the toggle flip-flop 14 is connected to the reset circuit 13 for resetting the counter 10 only when the toggle flip-flop is switched.

The remaining circuitry of the digitizer will be described before describing in more detail the operation of the circuit.

This digitizer is of the same type described in my copending application in that water depth measurements are made only from selected acoustic ranging pulses. The depth sounder itself has a timing cycle which is asynchronous with respect to the equipment which receives and records the digitized depth measurements. This equipment operates on its own external clock and the digitizer of FIG. 1 is synchronized with this external clock. In general there are many more depth sounder pulses than are required to obtain the desired measurements. Therefore, only certain depth sounder pulses are selected for measurement. In the particular embodiment being described one digitized depth sounder reading is obtained each minute.

The divide by 60 counter 16 establishes time synchronization between the digitizer and the associated data recording equipment. This insures that a depth sounder reading is digitized and ready to be recorded for each cycle of the recording equipment. The divide by 60 counter counts one pulse per second pulses from the external clock. The counter is reset by the one pulse per minute clock.

Decoder 17 decodes the count of 9 from the counter 16 and sets the latch circuit 18 in response to the count of 9. The output of latch circuit 18 enables gate 19 which sets the transmit select latch 20. This causes the reset circuit 13 to reset the counter 10.

The next occurring acoustic ranging pulse resets the transmit select latch 20. This triggers the single shot multivibrator 21. One output from single shot multivibrator 21 is inverted by gating circuit 22 and sets the count gate flip-flop 15 to enable gate 16. This allows the digital counter 10 to start counting the 2400 pulse per second pulses.

A second output from single shot multivibrator 21 resets the toggle flip-flop 14 so that the upper output is a logic zero and the lower output is a logic 1. The output of count gate flip-flop 15, which is a logic 1 after being set by the selected acoustic ranging pulse, is applied to the top steering input of the toggle flip-flop 14. This sets up the proper requirements for the toggle flip-flop 14 to flip to the opposite state if a second acoustic ranging pulse occurs without a receive pulse in between. Note that all acoustic ranging pulses are applied to the toggle input of the toggle flip-flop 14 through the gate 23.

Assume that the receive signal from the selected acoustic ranging pulse is too weak to be detected. Then, the next pulse which occurs will be the acoustic ranging pulse from the following depth sounding cycle. This acoustic ranging pulse will be applied through gate 23 to switch toggle flip-flop 14 so that the upper output is a logic 1 and the lower output is a logic 0. The upper output of toggle flip-flop 14 acts through reset circuit 13 to reset the counter 10 to zero. The lower output of toggle flip-flop 14 disables gate 16 to stop the 2400 pulse per second input to the counter 10.

The upper output of toggle flip-flop 14 enables gate 24 to transmit the one pulse per second train to gate 19. This sets the transmit select latch circuit 20 in preparation for digitizing the next depth sounding cycle. The next acoustic ranging pulse resets the transmit select latch 20 which triggers single shot 21. Single shot 21 produces the "selected transmit" pulse. This resets toggle flip-flop 14 and sets count gate flip-flop 15 to start a new count of the depth digitizing counter 10.

Now assume that the reflected acoustic ranging pulse is of sufficient amplitude to be detected. The receive pulse is transmitted through single shot 12, single shot 27 receive gate 28, gate 29 and gate 30 to reset the count gate flip-flop 15. This disables gate 16 to stop the counting of the counter 10.

The output of count gate flip-flop 15 is connected to the top steering input of toggle flip-flop 14. This is now a logic zero. This condition prevents toggle flip-flop 14 from changing states when the toggle input receives a pulse. Therefore no further action takes place and the digitized water depth is held in the counter 10 until the ninth second of the next one minute period.

The receive gate timer is not shown in FIG. 1. This opens the gate 28 a selected time interval after the acoustic ranging pulse to further reduce error caused by spurious pulses. This is more fully explained in my copending application.

While this invention can be implemented with many types of logic circuit, the following components are examples of those suitable for use:

Toggle Flip Flops: Motorola MC 853P
NAND Gates: Motorola MC 846P

While a particular embodiment of the invention has been shown and described modifications are within the true spirit and scope of the invention. The appended claims are intended to cover such modifications.

What is claimed is:

1. A water depth digitizer producing an averaged digital readout from a depth sounder producing acoustic ranging pulses in a plurality of depth sounding cycles and including a transducer producing receive signals representing the return of the reflected acoustic ranging pulses comprising:

a source of clock pulses,
a digital counter driven by said source of clock pulses for producing a digitized readout averaged over said plurality of depth sounding cycles and representing water depth,
means for starting said digital counter in response to the occurrence of each said acoustic ranging pulses,
means for stopping said digital counter in response to each of the receive signals occurring after each acoustic ranging pulse so that said digital counter produces an accumulated count of said clock pulses during the time intervals between each of said acoustic ranging pulses and their respective receive signals, said accumulated count representing water depth averaged over said plurality of depth sounding cycles,
a reset circuit for said counter, and
means for detecting the sequence of occurrences of said acoustic ranging pulses and the respective reflected receive signals and for enabling said reset circuit when a receive signal produced by the reflection of an acoustic ranging pulse is not received before the next occurring acoustic ranging pulse, the reset circuit setting said digital counter to zero to indicate that an inaccurate sequence of water depth soundings has occurred.

2. A water depth digitizer producing a digital readout from a depth sounder producing acoustic ranging pulses and including a transducer producing a receive signal representing the return of a reflected acoustic ranging pulse comprising:

a digital counter producing a digitized readout representing water depth,
means for starting said digital counter in response to an acoustic ranging pulse,
means for stopping said counter in response to said receive signal so that said digital counter accumulates counts representing water depth,
a reset circuit for said counter, and
means for enabling said reset circuit when a receive signal is not received before the next occurring acoustic ranging pulse, said means comprising:
a toggle flip-flop of the type having two steering inputs and a toggle input, said acoustic ranging pulses being applied to said toggle input, a count gate flip-flop which is set by an acoustic ranging pulse and reset by said receive signal, the output of said count gate flip-flop being connected to a steering input of said toggle flip-flop so that the next occurring acoustic ranging pulse will switch the state of said toggle flip-flop only if said count flip-flop is in the set position, and the output of said toggle flip-flop being connected to said reset circuit for resetting said counter when said toggle flip-flop is switched.

3. The digitizer recited in claim 2 further comprising:

a transmit select latch which is periodically set, said acoustic ranging pulses being applied to reset said latch, and means responsive to the resetting of said latch to produce a selected transmit pulse which is applied to said means for starting said counter.

4. The digitizer recited in claim 3 wherein the output of said toggle flip-flop is connected to set said transmit select latch when said toggle flip-flop is switched in preparation for digitizing the next depth sounding cycle.

5. The digitizer recited in claim 3 wherein said selected transmit pulse is applied to reset said toggle flip-flop.

* * * * *